US010341169B2

(12) United States Patent
Rajagopal et al.

(10) Patent No.: US 10,341,169 B2
(45) Date of Patent: Jul. 2, 2019

(54) METHOD AND A SYSTEM FOR GENERATING A NOTIFICATION FOR AN EVENT

(71) Applicant: Wipro Limited, Bangalore (IN)

(72) Inventors: Harish Nair Rajagopal, Trivandrum (IN); Abul Koyes Choudhury, Bangalore (IN); Sreeprakash Thonikkandy, Nellimaalam (IN)

(73) Assignee: Wipro Limited, Bangalore (IN)

( * ) Notice: Subject to any disclaimer, the term of this patent is extended or adjusted under 35 U.S.C. 154(b) by 351 days.

(21) Appl. No.: 15/429,460

(22) Filed: Feb. 10, 2017

(65) Prior Publication Data

US 2018/0176076 A1    Jun. 21, 2018

(30) Foreign Application Priority Data

Dec. 21, 2016 (IN) .............................. 201641043694

(51) Int. Cl.
*G06F 15/16* (2006.01)
*H04L 12/24* (2006.01)
(Continued)

(52) U.S. Cl.
CPC ...... *H04L 41/0686* (2013.01); *G06F 11/0709* (2013.01); *G06F 11/0781* (2013.01);
(Continued)

(58) Field of Classification Search
USPC ....... 709/203, 206, 217, 219, 223, 224, 226, 709/228, 230, 232, 238; 370/218;
(Continued)

(56) References Cited

U.S. PATENT DOCUMENTS 8,144,840 B2 * 3/2012 Luehrig ............. G06Q 30/0258
709/219
2006/0136784 A1 6/2006 Prescott et al.
(Continued)

OTHER PUBLICATIONS

Extended European Search Report issued in the European Patent Office in counterpart European Application No. 17161221.1, dated Oct. 30, 2017, 14 pages.

*Primary Examiner* — Quang N Nguyen
(74) *Attorney, Agent, or Firm* — Finnegan, Henderson, Farabow, Garrett & Dunner, LLP (57) ABSTRACT

The present disclosure is related in general to content management and a method and system for generating a notification for an event. A notification generation system receives a recovery notification that indicates recovery from the event and contextual data associated with the event from a service provider. The event is a disruption caused in delivering multimedia content such as audio, video, text, images etc. to a user interested to access the multimedia content from the service provider. Further, the notification generation system generates the notification upon analysis of the recovery notification, the contextual data and predefined profile settings of the user. The notification is generated and provided to the user to indicate recovery of the multimedia content from transient disruption so that the user is well informed for better usage of services provided by the service provider. Further, the notification is provided on the preferred electronic devices of the user.

13 Claims, 6 Drawing Sheets

(51) Int. Cl.
*H04L 29/06* (2006.01)
*H04L 29/08* (2006.01)
*G06F 11/07* (2006.01)
*G06F 11/32* (2006.01)

(52) U.S. Cl.
CPC .......... *G06F 11/32* (2013.01); *H04L 41/0654* (2013.01); *H04L 65/1083* (2013.01); *H04L 65/4069* (2013.01); *H04L 67/2847* (2013.01); *H04L 67/306* (2013.01)

(58) Field of Classification Search
USPC ...................................................... 379/88.14
See application file for complete search history.

(56) References Cited

U.S. PATENT DOCUMENTS

| | | |
|---|---|---|
| 2010/0046529 A1 | 2/2010 | Roberts et al. |
| 2011/0296456 A1 | 12/2011 | Pandala |
| 2012/0144021 A1* | 6/2012 | Carey ................. G06F 11/3006 709/224 |
| 2012/0278431 A1* | 11/2012 | Luna ..................... G06F 9/5027 709/217 |
| 2013/0061091 A1 | 4/2013 | Moore et al. |
| 2015/0067401 A1 | 3/2015 | Ichikawa et al. |
| 2016/0112248 A1* | 4/2016 | Torigoe ............... H04L 12/6418 370/218 |

\* cited by examiner

METHOD AND A SYSTEM FOR GENERATING A NOTIFICATION FOR AN EVENT

TECHNICAL FIELD

The present subject matter relates generally to network data communications, and more particularly, but not exclusively to a method and a system for generating a notification for an event.

BACKGROUND

Generally, playback of content, live streaming of content etc. are performed through various devices and applications. For example, streaming of media assets from a server computer to one or more devices over a network. Occasionally content related errors may occur during the playback of the content or the live streaming of the content over managed or unmanaged networks. The error may occur due to network failure while delivering the content, server failures or server application failures that serve the content to be delivered etc. This may result in substantial loss for the content/service provider in terms of time and resources. Further, there is a risk of losing reliability factor if the errors occur persistently due to which users/subscribers may subscribe with other service providers for future ventures who may be more reliable.

Existing techniques have network monitoring or operations monitoring services that run-on servers which uses information from application services such as streaming servers, Content Delivery Network (CDN), Points of Presence (PoPs), rights services, listing services, subscriber services etc. and error handling infrastructures to understand faults that occur within the ecosystem. This can isolate problems that may occur at the backend and diagnose faults either immediately or over an extended period. However, in the existing techniques, user may not be aware that the content is available for consumption after a certain time period, upon resolving the faults, due to unavailability of a notification or an alert to the user. Due to the unavailability of the notification, the user may not be able to access the content at right time, hence, the user may try to access the same content in other devices before the error is diagnosed and encounter the same errors which may lead to unnecessary distress, bandwidth consumption, loss of valuable time of the user, the user may lose interest in accessing the content, the user may subscribe to another service provider for accessing the same content.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Disclosed herein are a method and a system for generating a notification for an event. The method comprising receiving, by a notification generation system, a recovery notification indicating recovery from the event, from a service provider. Further, the notification generation system receives contextual data, from the service provider. The contextual data comprises state of the event in a first electronic device associated with a user, one or more predefined rules associated with the event and availability of one or more second electronic devices associated with the user. Finally, the notification generation system generates a notification upon analysis of the recovery notification, the contextual data and predefined profile settings of the user.

Further, the present disclosure comprises a notification generation system for generating a notification for an event. The notification generation system comprises a processor and a memory communicatively coupled to the processor. The memory stores the processor-executable instructions, which, on execution, causes the processor to receive a recovery notification indicating recovery from the event, from a service provider. Further, the processor receives contextual data, from the service provider, comprising state of the event in a first electronic device associated with a user, one or more predefined rules associated with the event and availability of one or more second electronic devices associated with the user. Finally, the processor generates a notification upon analysis of the recovery notification, the contextual data and predefined profile settings of the user.

Further, the present disclosure comprises a non-transitory computer readable medium including instructions stored thereon that when processed by at least one processor causes a notification generation system to perform operations comprising receiving a recovery notification indicating recovery from the event, from a service provider. The instructions further cause the processor to receive contextual data from the service provider comprising state of the event in a first electronic device associated with a user, one or more predefined rules associated with the event and availability of at least one of the first electronic device and one or more second electronic devices associated with the user. Finally, the instructions cause the processor to generate a notification upon analysis of the recovery notification, the contextual data and predefined profile settings of the user.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DIAGRAMS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure provides a method and a system for generating a notification for an event. The system may receive a recovery notification from a service provider that indicates recovery from the event. The event may be a disruption in delivering multimedia content such as audio, video, text, images etc. to a user interested to access the multimedia content from the service provider. Further, the notification generation system receives contextual data, from the service provider. The contextual data comprises state of the event in a first electronic device associated with a user, one or more predefined rules associated with the event and availability of one or more second electronic devices associated with the user. The first electronic device is an electronic device associated with the user using which the user may be currently accessing the multimedia content provided by service provider. The one or more second electronic devices are alternative electronic devices preferred by the user to access the multimedia content. Finally, the notification generation system generates the notification upon analysis of the recovery notification, the contextual data and predefined profile settings of the user. The notification is generated and provided to the user to indicate recovery of the multimedia content from transient disruption, so that the user is well informed for better usage of services provided by the service provider. Further, the notification may be provided on the preferred electronic devices such as the first electronic device and the one or more second electronic devices of the user as specified in the predefined profile settings of the user.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1A:
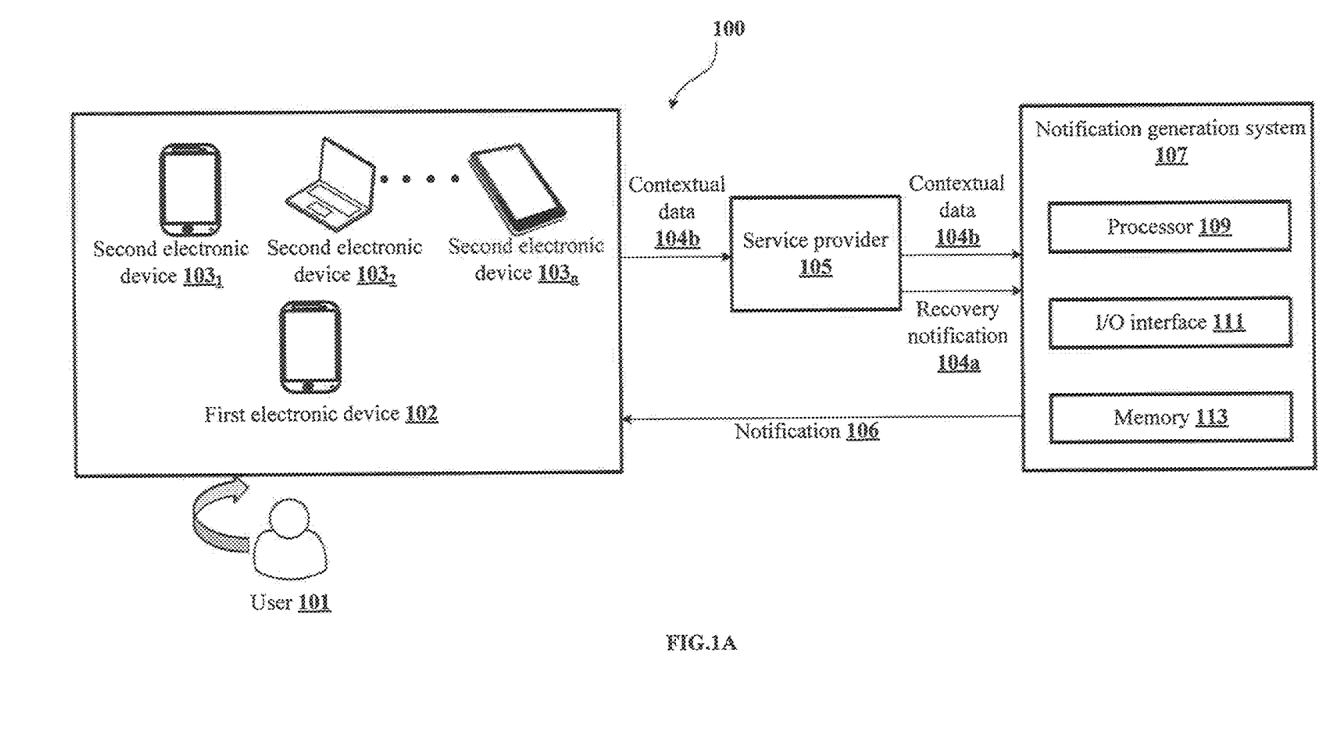
FIG. 1A shows an exemplary architecture for generating a notification for an event in accordance with some embodiments of the present disclosure.

FIG. 1 shows an exemplary architecture for generating a notification for an event in accordance with some embodiments of the present disclosure.

The architecture 100 comprises a user 101, a first electronic device 102, one or more second electronic devices, second electronic device $103_1$ to second electronic device $103_n$ (collectively referred to as the one or more second electronic devices 103), a service provider 105 and a notification generation system 107. The user 101 is a person interested to access multimedia content from the service provider 105 associated with the user 101. As an example, the multimedia content may include, but not limited to, text, images, audio, video, interactive content, graphic image files and animations. In an embodiment, the multimedia content serves its purpose by utilizing a software. As an example, audio files may be played using a software such as Media player, Text files may be read using a software such as Notepad, Word etc. Therefore, the software is an integral part of the multimedia content. Further, as an example, the service provider 105 may include, but not limited to, a Direct To Home (DTH) service provider like Dish TV, Airtel, Sun direct, Tata sky etc., an online content service provider such as Netflix, Hotstar, YouTube etc. The service provider 105 delivers the multimedia content to at least one of the first electronic device 102 and the one or more second electronic devices 103 associated with the user 101 upon receiving user's request to access the multimedia content. In an embodiment, the first electronic device 102 is an electronic device associated with the user 101 using which the user 101 may be currently accessing the multimedia content provided by the service provider 105. The one or more second electronic devices 103 are alternative electronic devices that the user 101 prefers for accessing the multimedia content. As an example, the first electronic device 102 and the one or more second electronic devices 103 may include, but not limited to, a mobile, a tablet, an e-book reader, a notebook, a laptop, a server, a desktop, a television and a gaming console.

Further, any disruption while delivering the multimedia content to the user 101 causes an event that needs to be recovered. As an example, the disruptions may occur in, but not limited to, transient nature of the communication network such as Content Delivery Network (CDN) going down, network switches, transient server load conditions and transient failures of Digital Rights Management (DRM) server. The disruption might affect the multimedia content at beginning stages or at intermediate stages. The exact point when the disruption has occurred may be an important factor in delivering the multimedia content from that point after recovery from the event.

Upon recovery from the event, the notification generation system 107 receives a recovery notification 104a from the service provider 105 via a communication network (not shown in the figure). In an embodiment, the communication network 105 may be at least one of wired communication network, and wireless communication network. The recovery notification 104a indicates the recovery from the event occurred, wherein the event is recovered by the service provider 105 associated with the notification generation system 107. Further, the service provider 105 transmits contextual data 104b associated with the event to the notification generation system 107. In an embodiment, the contextual data 104b is data associated with the event such as background of the event, conditions that cause the event etc. which provide a clear information about the event occurred. As an example, the contextual data 104b may include, but not limited to, state of the event in the first electronic device 102, one or more predefined rules associated with the event and availability of at least one of the first electronic device 102 and the one or more second electronic devices 103. As an example, in a non-limiting embodiment, the one or more predefined rules may be related to time elapsed since occurrence of the event, priority of the event, re-occurrence of the event, type of the event, frequency of occurrence of the event across various electronic devices, history of the event, point at which the event occurred etc.

Figure 1B:
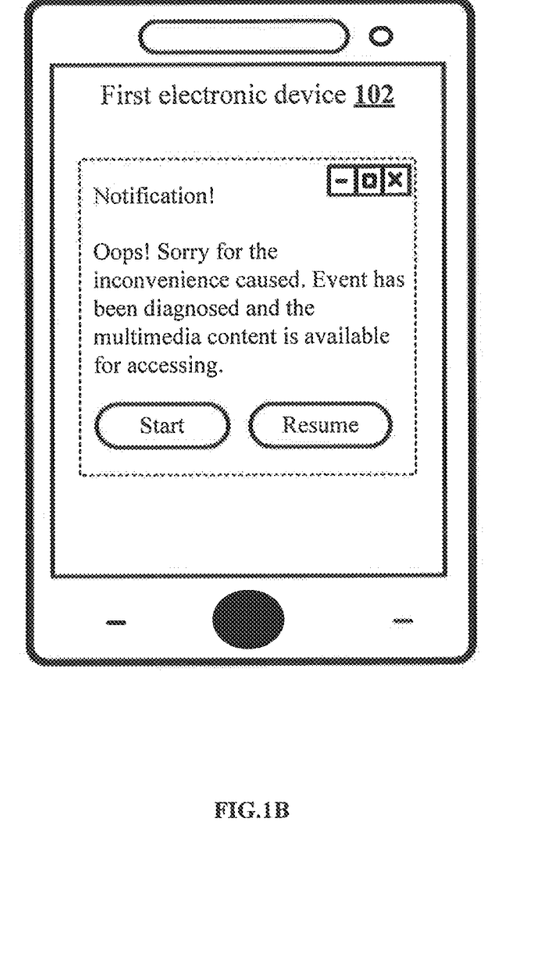
FIG. 1B shows exemplary notification generated for an event transmitted to a first electronic device in accordance with some embodiments of the present disclosure.
Figure 1C:
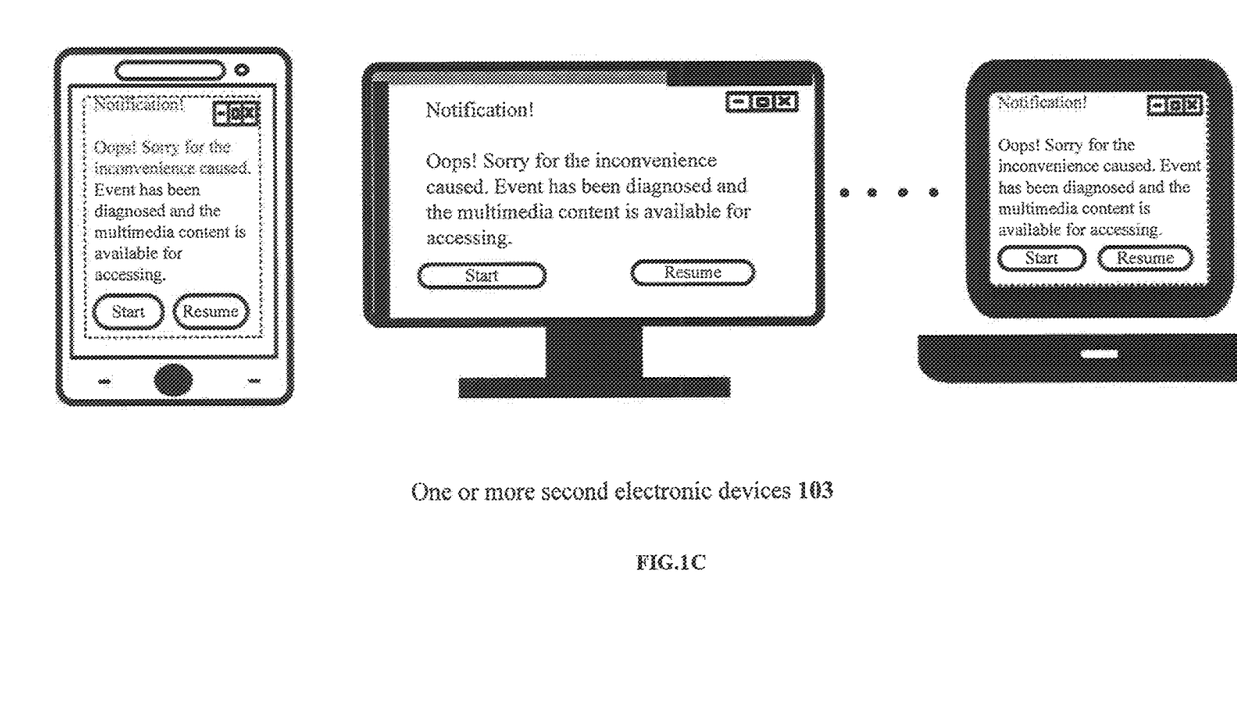
FIG. 1C shows exemplary notification generated for an event transmitted to one or more second electronic devices in accordance with some embodiments of the present disclosure.

The notification generation system 107 comprises a processor 109, an I/O interface 111 and a memory 113. The I/O interface 111 receives the recovery notification 104a and the contextual data 104b from the service provider 105. The recovery notification 104a and the contextual data 104b are stored in the memory 113. Upon receiving the contextual data 104b, the processor 109 indicates time required to recover from the event to the user 101. Further, the processor 109 analyzes the recovery notification 104a, the contextual data 104b and predefined profile settings of the user 101 to generate a notification 106. As an example, the predefined profile settings of the user 101 may include, but not limited to, "notification enabling status", "notification level", preferred electronic device to receive the notification 106 and history of the multimedia content accessed across various electronic devices. In an embodiment, the notification 106 indicates availability of the multimedia content after the recovery from the event. Further, the notification level indicates severity of receiving the notification 106 by the user 101 in terms of "High", "Medium" and "low". Based on the analysis, if the notification 106 is generated, the processor 109 transmits the notification 106 via a notification delivery module (not shown in the figure) to at least one of the first electronic device 102 as shown in FIG. 1B and the one or more second electronic devices 103 as shown in FIG. 1C. In some embodiment, the notification delivery module may be present within the notification generation system 107. In some other embodiment, the notification delivery module may be either standalone or present outside but associated with the notification generation system 107. Due to one or more factors, if result of the analysis does not demand generation of the notification 106, the processor 109 may not generate the notification 106 upon recovery from the event.

Figure 2:
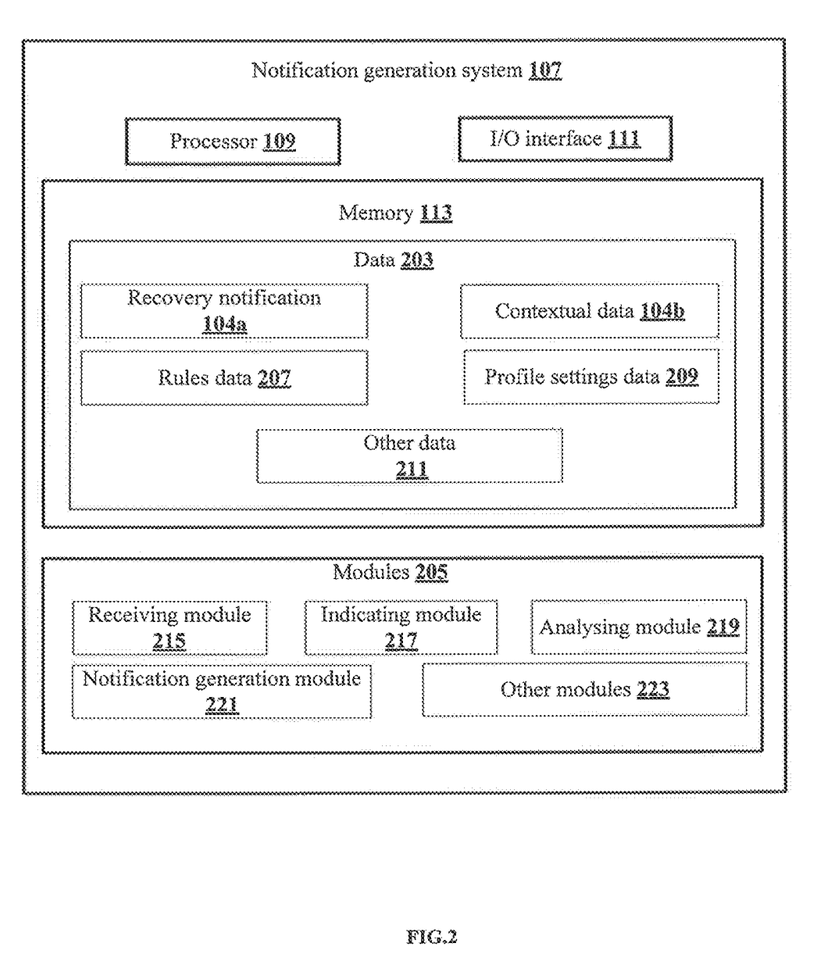
FIG. 2 shows a detailed block diagram of a notification generation system for generating a notification for an event in accordance with some embodiments of the present disclosure.

FIG. 2 shows a detailed block diagram of a notification generation system 107 for generating a notification for an event in accordance with some embodiments of the present disclosure.

In one implementation, the notification generation system 107 receives recovery notification 104a and contextual data 104b from a service provider 105. As an example, the recovery notification 104a and the contextual data 104b received are stored in the memory 113 configured in the notification generation system 107 as shown in the FIG. 2. In one embodiment, data 203 includes the recovery notification 104a, the contextual data 104b, rules data 207, profile settings data 209 and other data 211. In the illustrated FIG. 2, modules 205 are described herein in detail.

In some embodiment, the data 203 may be stored in the memory 113 in the form of various data structures. Additionally, the aforementioned data 203 can be organized using data models, such as relational or hierarchical data models. The other data 211 may store data, including temporary data and temporary files, generated by modules 205 for performing the various functions of the notification generation system 107.

In some embodiment, the recovery notification 104a indicates recovery from an event. The event is a disruption caused in delivering a multimedia content by a service provider 105.

In some embodiment, the contextual data 104b is associated with the event occurred. As an example, the contextual data 104b may include, but not limited to, state of the event in a first electronic device 102 associated with the user 101, one or more predefined rules associated with the event and availability of at least one of the first electronic device 102 and one or more second electronic devices 103 associated with the user 101.

In some embodiment, the rules data 207 comprises one or more predefined rules associated with the event. As an example, the one or more predefined rules may be related with, but not limited to, time elapsed since occurrence of the event, priority of the event, re-occurrence of the event, type of the event, frequency of occurrence of the event across various electronic devices, history of the event and point at which the event occurred.

In some embodiment, the profile settings data 209 comprises predefined profile settings of the user 101. As an example, the predefined profile settings of the user 101 may include, but not limited to, "notification enabling status", "notification level", history of the multimedia content accessed across various electronic devices and preferred electronic device to receive the notification. In an embodiment, the notification level indicates severity of receiving the notification 106 by the user 101 in terms of "High", "Medium" and "low".

In some embodiment, the data stored in the memory 113 is processed by the modules 205 of the notification generation system 107. The modules 205 may be stored within the memory 113. In an example, the modules 205 communicatively coupled to a processor 109 configured in the notification generation system 107, may also be present outside the memory 113 as shown in FIG. 2 and implemented as hardware. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

In an embodiment, the modules 205 may include, for example, a receiving module 215, an indicating module 217, an analysing module 219, a notification generating module 221 and other modules 223. The other modules 223 may be used to perform various miscellaneous functionalities of the notification generation system 107. It will be appreciated that such aforementioned modules 205 may be represented as a single module or a combination of different modules.

In some embodiment, the receiving module 215 receives the recovery notification 104a from the service provider 105 of the multimedia content upon recovery from the event. In an embodiment, the event is recovered by the service provider 105 by activating one or more corrective actions and recovery mechanisms. Further, the receiving module 215 receives the contextual data 104b associated with the event from the service provider 105. The contextual data 104b may include, but not limited to, state of the event in a first electronic device 102 associated with the user 101, one or more predefined rules associated with the event and availability of at least one of the first electronic device 102 and the one or more second electronic devices 103.

In some embodiment, the indicating module 217 indicates, to the user 101, time required to recover from the event upon receiving the contextual data 104b from the service provider 105. In some embodiment, the indicating module 217 compares the event with one or more predefined events stored in the memory 113 to detect type of recovery mechanisms that may be used to diagnose the event. Based on the recovery mechanism detected, the time required to recover from the event may be determined. In another embodiment, the time required to recover from the event may be predefined along with the recovery mechanism.

In an embodiment, the analyzing module 219 analyzes the recovery notification 104a, the contextual data 104b and the predefined profile settings of the user 101 to determine whether notification 106 must be generated or not. The analysing module 219 may analyse one or more factors such as whether the multimedia content has been accessed again by the user 101 since the occurrence of the event, whether the user 101 used a first electronic device 102 associated with the user 101 or one or more second electronic devices 103 associated with the user 101 to access the multimedia content, whether the multimedia content can be made available to the user 101 when the notification 106 is sent, whether a transient failure condition has occurred again at the time of sending the notification 106 to the user 101, whether pre-caching of the multimedia content is required to ensure that the event does not re-occur and pre-caching the multimedia content if it is required, whether the multimedia content is available to the user 101 in the one or more second electronic devices 103, whether the user 101 is still interested in accessing the multimedia content if the notification 106 is given based on accessing patterns of the user 101, time window of interest of the user 101 etc., whether the user 101 has already accessed the multimedia content from other service providers etc. In some embodiment, the notification 106 indicates, to the user 101, availability of the multimedia content upon recovery from the event. Further, the analysing module 219 analyses based on the one or more factors whether the notification 106 should be generated or not, whether the notification 106 should be sent to the first electronic device 102 or the one or more second electronic devices 103, whether the multimedia content should be delivered from intermediate stages where the event occurred or from beginning etc. The analysing module 219 activates the notification generating module 221 if result of the analysis demands generation of the notification. If the result of the analysis does not demand generation of the notification, then the user 101 is not notified about the availability of the multimedia content upon recovery from the event.

In an embodiment, the notification generating module 221 generates the notification 106 and provides the notification 106 to the user 101 to indicate that the event has been recovered and the multimedia content is available to be accessed by the user 101. The notification 106 is generated based on the result of the analysis obtained from the analysing module 219.

Scenario-1

Consider an exemplary scenario where the user 101 uses services of a service provider "Netflix" to access a multimedia content "Movie" which belongs to category of a video. Further, consider that length of the movie requested by the user 101 is for 120 minutes. Upon receiving the movie from the service provider "Netflix", the user 101 attempts playback of the movie in his laptop i.e. the first electronic device 102 via a playback client application installed in the first electronic device 102. The movie plays correctly till the $100^{th}$ minute and stopped beyond the $100^{th}$ minute due to a disruption caused in delivery of the movie. Therefore, the disruption gives rise to an event where part of the movie beyond the $100^{th}$ minute was corrupt due to which the user 101 could not watch the movie further. The service provider "Netflix" observes that the event has occurred and collects one or more predefined rules of the event as shown in the below Table 1.

TABLE 1

| Predefined rules of the event | Value |
|---|---|
| Point at which the event occurred | $100^{th}$ minute out of 120 minutes |
| Time elapsed since occurrence of the event | 30 seconds |
| Priority of the event | High |
| Re-occurrence of the event | Yes |

Further, the service provider "Netflix" learns state of the event as "Not recovered" and identifies from the predefined profile settings of the user 101 if the user 101 has preferred to receive the notification 106 on the one or more second electronic devices 103. The service provider "Netflix" transmits, to the notification generation system 107, the contextual data 104b associated with the event comprising the one or more predefined rules associated with the event, state of the event as "Not recovered" and preferred electronic device to receive the notification 106. Upon receiving the contextual data 104b from the service provider "Netflix", the notification generation system 107 indicates, to the user 101, time required to recover from the event as 2 minutes. Based on the indication, the user 101 decides to wait for 2 minutes before trying to access the content from other service providers or in the one or more second electronic devices 103.

Further, upon diagnosing the event, the service provider "Netflix" sends a recovery notification 104a, to the notification generation system 107, indicating recovery from the event. Upon receiving the recovery notification 104a, the notification generation system 107 analyses the recovery notification 104a, the contextual data 104b and the predefined profile settings of the user 101. The predefined profile settings of the user 101 are shown in the below Table 2.

TABLE 2

| Predefined profile settings of the user | Value |
|---|---|
| Notification enabling status | Yes |
| Notification level | High |

TABLE 2-continued

| Predefined profile settings of the user | Value |
| --- | --- |
| Preferred electronic device to receive notification | Laptop (first electronic device 102) and Mobile (second electronic device 103) |

Therefore, based on the analysis, the notification generation system 107 understands that the notification 106 has to be generated as receiving the notification 106 is enabled, notification level indicating severity of receiving the notification 106 is set to be "High", unavailability of information regarding the user 101 trying to access the movie using via other service providers or the one or more second electronic devices 103, state of the event is "Not recovered" and preferred electronic device is mentioned as the laptop and the mobile associated with the user 101. Therefore, the notification generation system 107 generates the notification 106, to the user 101, indicating the availability of the movie for resuming. Subsequent to the notification, the user 101 attempts the playback of the movie which in turn resumes the movie from the 100$^{th}$ minute.

In the above scenario, if the user 101 had successfully accessed the movie in the one or more second electronic devices 103 or by using the services of other service providers etc. after the occurrence of the event instead of waiting for the recovery from the event, the notification generation system 107 would not generate the notification 106 based on state of the event.

Figure 3:
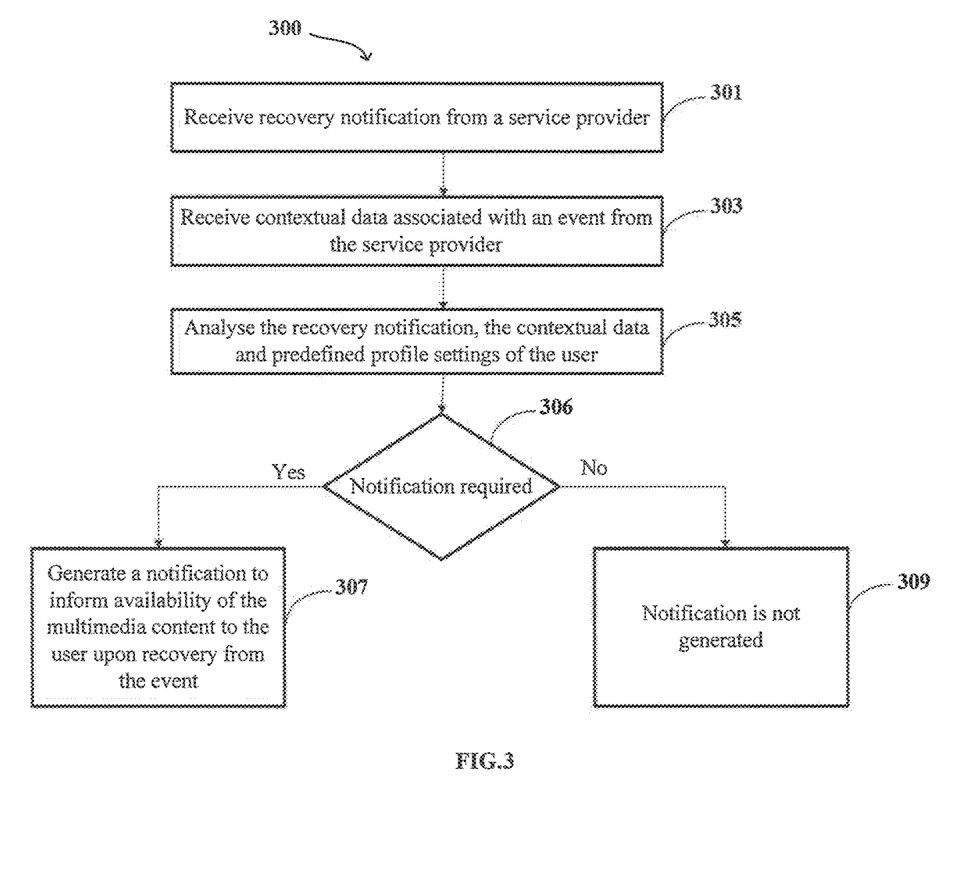
FIG. 3 shows a flowchart illustrating a method for generating a notification for an event in accordance with some embodiments of the present disclosure.

FIG. 3 shows a flowchart illustrating a method for generating a notification for an event in accordance with some embodiments of the present disclosure.

As illustrated in FIG. 3, the method 300 comprises one or more blocks illustrating a method for generating a notification 106 for an event. The method 300 may be described in the general context of computer executable instructions. Generally, computer executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, a recovery notification 104a is received from a service provider 105. In some embodiment, a processor 109 of a notification generation system 107 receives the recovery notification 104a. The recovery notification 104a indicates recovery from the event occurred.

At block 303, contextual data 104b is received from the service provider 105. In some embodiment, the processor 109 receives the contextual data 104b associated with an event which is a disruption observed in delivery of multimedia content to a user 101. As an example, the contextual data 104b may include, but not limited to, state of the event in a first electronic device 102 associated with a user 101, one or more predefined rules associated with the event and availability of at least one of the first electronic device 102 and one or more second electronic devices 103 associated with the user 101. As an example, the multimedia content may include, but not limited to, text, images, audio, video, interactive content, graphic image files and animations. In an embodiment, the multimedia content serves its purpose by utilizing a software. As an example, audio files may be played using a software such as Media player, Text files may be read using a software such as Notepad, Word etc. Therefore, the software is an integral part of the multimedia content. Further, as an example, the service provider 105 may include, but not limited to, a Direct To Home (DTH) service provider like Dish TV, Airtel, Sun direct. Tata sky etc., an online content service provider such as Netflix, Hotstar, YouTube etc.

At block 305, an analysis is performed using the recovery notification 104a, the contextual data 104b and predefined profile settings of the user 101. As an example, the predefined profile settings of the user 101 may include, but not limited to, "notification enabling status", "notification level", history of the multimedia content accessed across various electronic devices and preferred electronic device to receive the notification. In some embodiment, the notification level indicates severity of receiving the notification 106 by the user 101 in terms of "High", "Medium" and "low".

At block 306, the processor 109 checks for a condition to see if result of the analysis demands generating a notification 106. If the result of the analysis demands generating the notification 106, the method proceeds to "block 307" via "Yes". If the result of the analysis does not demand generating the notification 106, the method proceeds to "block 309" via "No".

At block 307, the notification 106 is generated based on the result of the analysis. In some embodiment, the processor 109 generates the notification 106 indicating availability of the multimedia content upon recovery from the event and transmits the notification 106 to the user 101.

At block 309, the notification 106 is not generated based on the result of the analysis. In some embodiment, the processor 109 does not generate the notification 106. Therefore, the user 101 may not be notified about the availability of the multimedia content upon recovery from the event.

Figure 4:
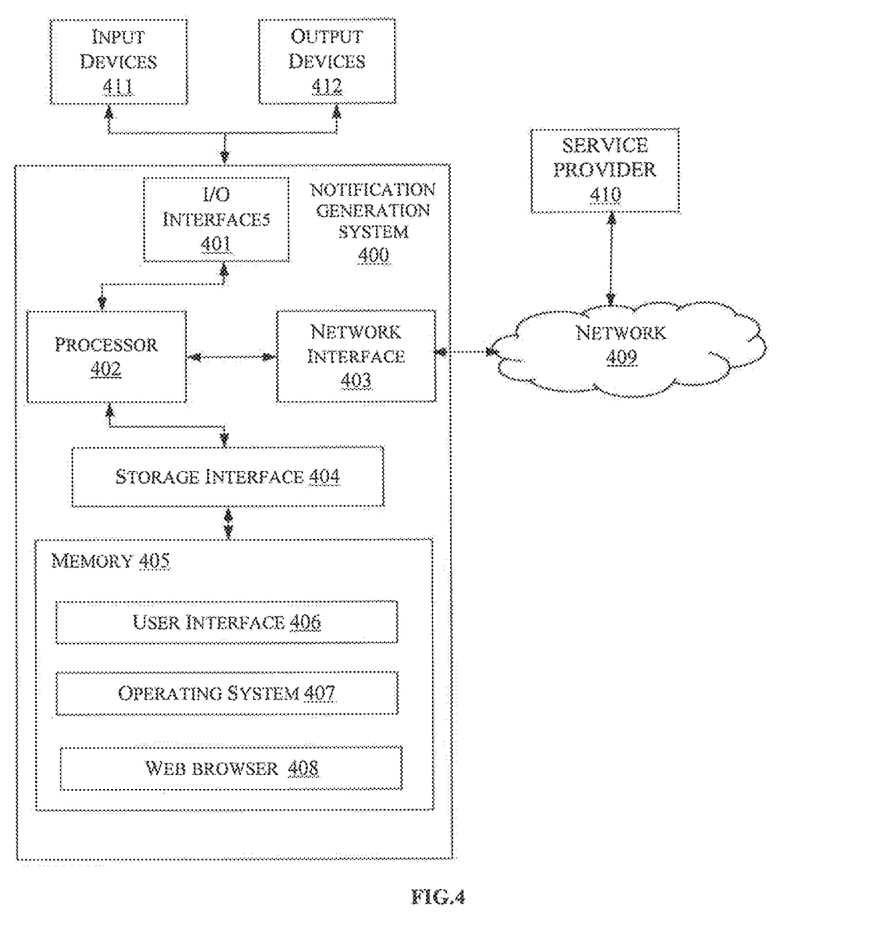
FIG. 4 is a block diagram of an exemplary computer system for implementing embodiments consistent with the present disclosure.

FIG. 4 is a block diagram of an exemplary computer system for implementing embodiments consistent with the present disclosure.

In an embodiment, the notification generation system 400 is used for generating a notification for an event. The notification generation system 400 may comprise a central processing unit ("CPU" or "processor") 402. The processor 402 may comprise at least one data processor for executing program components for executing user- or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, the notification generation system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the notification generation system 400 may communicate with one or more data sources 410 (a, . . . , n). The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/ Internet Protocol (TCP/IP), Wireless Application Protocol (WAP), etc., to communicate with each other. Further, the communication network 409 may include a variety of network devices, including routers, bridges, servers, computing devices, storage devices, etc. The service provider 410 may include, without limitation, a Direct To Home (DTH) service provider like Dish TV, Airtel, Sun direct, Tata sky etc., an online content service provider such as Netflix, Hotstar, YouTube etc.

In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user interface application 406, an operating system 407, web browser 408 etc. In some embodiments, the notification generation system 400 may store user/application data, such as the data, variables, records, etc. as described in this invention. Such databases may be implemented as fault-tolerant, relational, scalable, secure databases such as Oracle or Sybase.

The operating system 407 may facilitate resource management and operation of the notification generation system 400. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), International Business Machines (IBM) OS/2, Microsoft Windows (XP, Vista/ 7/8, etc.), Apple iOS, Google Android, Blackberry Operating System (OS), or the like. User interface 406 may facilitate display, execution, interaction, manipulation, or operation of program components through textual or graphical facilities. For example, user interfaces may provide computer interaction interface elements on a display system operatively connected to the notification generation system 400, such as cursors, icons, check boxes, menus, scrollers, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the notification generation system 400 may implement a web browser 408 stored program component. The web browser 408 may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the notification generation system 400 may implement a mail server stored program component. The mail server may be an Internet mail server such as Microsoft Exchange, or the like. The mail server may utilize facilities such as Active Server Pages (ASP). ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the notification generation system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Advantages of the Embodiment of the Present Disclosure are Illustrated Herein.

In an embodiment, the present disclosure provides a method and a system for generating a notification for an event.

The present disclosure provides a feature wherein a notification is provided to the user indicating recovery of the multimedia content from transient disruption so that the user is well informed for better usage of services provided by the service provider.

The present disclosure provides a feature wherein the notification is provided on to an electronic device in which the user was accessing the multimedia content or to alternative electronic devices preferred by the user to access the multimedia content as specified in predefined profile settings of the user.

A description of an embodiment with several components in communication with each other does not imply that all such components are required. On the contrary a variety of optional components are described to illustrate the wide variety of possible embodiments of the invention.

When a single device or article is described herein, it will be apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for generating a notification for an event. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

| Referral numerals | |
|---|---|
| Reference Number | Description |
| 100 | Architecture |
| 101 | User |
| 102 | First electronic device |
| 103 | One or more second electronic devices |
| 104a | Recovery notification |
| 104b | Contextual data |
| 105 | Service provider |
| 106 | Notification |
| 107 | Notification generation system |
| 109 | Processor |
| 111 | I/O interface |
| 113 | Memory |
| 203 | Data |
| 205 | Modules |
| 207 | Rules data |
| 209 | Profile settings data |
| 211 | Other data |
| 215 | Receiving module |
| 217 | Indicating module |
| 219 | Analysing module |
| 221 | Notification generating module |
| 223 | Other modules |

What is claimed is:

1. A method for generating a notification for an event, the method comprising:
   receiving, by a notification generation system, a recovery notification indicating recovery from the event, from a service provider;
   receiving, by the notification generation system, contextual data, from the service provider, comprising state of the event in a first electronic device associated with a user, one or more predefined rules associated with the event and availability of at least one of the first electronic device and one or more second electronic devices associated with the user; and
   generating, by the notification generation system, a notification upon analysis of the recovery notification, the contextual data and predefined profile settings of the users;
   wherein the one or more predefined rules are related to at least one of time elapsed since occurrence of the event, priority of the event or re-occurrence of the event, and
   wherein the predefined profile settings of the user comprise at least one of "notification enabling status", "notification level" or "preferred electronic device" to receive the notification.

2. The method as claimed in claim 1 further comprising providing the notification to at least one of the first electronic device and the one or more second electronic devices.

3. The method as claimed in claim 1, wherein the event comprises a disruption in delivering multimedia content.

4. The method as claimed in claim 3 further comprising preventing re-occurrence of the event by pre-caching the multimedia content associated with the event.

5. The method as claimed in claim 1, wherein the notification indicates availability of the multimedia content after the recovery from the event.

6. The method as claimed in claim 1 further comprising indicating to the user, time required for the recovery of the event before generating the notification.

7. A notification generation system for generating a notification for an event, the notification generation system) comprising:
   a processor; and
   a memory communicatively coupled to the processor, wherein the memory stores the processor-executable instructions, which, on execution, causes the processor to:

receive a recovery notification indicating recovery from the event, from a service provider;
receive contextual data, from the service provider, comprising state of the event in a first electronic device associated with a user one or more predefined rules associated with the event and availability of at least one of the first electronic device and one or more second electronic devices associated with the user; and
generate a notification upon analysis of the recovery notification the contextual data and predefined profile settings of the user;
wherein the one or more predefined rules are related to at least one of time elapsed since occurrence of the event, priority of the event or re-occurrence of the event, and
wherein the predefined profile settings of the user comprise at least one of "notification enabling status", "notification level" or "preferred electronic device" to receive the notification.

8. The notification generation system as claimed in claim 7, wherein the processor further provides the notification to at least one of the first electronic device and the one or more second electronic devices.

9. The notification generation system as claimed in claim 7, wherein the event comprises a disruption in delivering multimedia content.

10. The notification generation system as claimed in claim 9, wherein the processor further prevents re-occurrence of the event by pre-caching the content associated with the event.

11. The notification generation system as claimed in claim 7, wherein the notification indicates availability of the multimedia content after the recovery from the event.

12. The notification generation system as claimed in claim 7, wherein the processor further indicates to the user, time required for the recovery of the event before generating the notification.

13. A non-transitory computer readable medium including instructions stored thereon that when processed by at least one processor causes a notification generation system to perform operations comprising:
receiving a recovery notification indicating recovery from an event, from a service provider;
receiving contextual data, from the service provider, comprising state of the event in a first electronic device associated with a user, one or more predefined rules associated with the event and availability of at least one of the first electronic device and one or more second electronic devices associated with the user; and
generating a notification upon analysis of the recovery notification, the contextual data and predefined profile settings of the user;
wherein the one or more predefined rules are related to at least one of time elapsed since occurrence of the event, priority of the event or re-occurrence of the event, and
wherein the predefined profile settings of the user comprise at least one of "notification enabling status", "notification level" or "preferred electronic device" to receive the notification.

* * * * *